United States Patent
Liu et al.

(10) Patent No.: US 8,958,465 B2
(45) Date of Patent: Feb. 17, 2015

(54) INITIALIZATION AND TRACKING FOR LOW POWER LINK STATES

(71) Applicant: Futurewei Technologies, Inc., Plano, TX (US)

(72) Inventors: Yixian Liu, Shenzhen (CN); Amir H. Fazlollahi, San Jose, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 14/053,101

(22) Filed: Oct. 14, 2013

(65) Prior Publication Data

US 2014/0105314 A1  Apr. 17, 2014

Related U.S. Application Data

(60) Provisional application No. 61/714,525, filed on Oct. 16, 2012.

(51) Int. Cl.
*H04B 1/38* (2006.01)
*H04B 3/32* (2006.01)

(52) U.S. Cl.
CPC .. *H04B 3/32* (2013.01); *Y02B 60/33* (2013.01)
USPC .......................................................... 375/222

(58) Field of Classification Search
CPC .................................. H04B 3/32; Y02B 60/33
USPC .......................................................... 375/222
See application file for complete search history.

(56) References Cited

U.S. PATENT DOCUMENTS

| | | | |
|---|---|---|---|
| 2004/0160906 A1* | 8/2004 | Greszczuk et al. | 370/311 |
| 2005/0169392 A1* | 8/2005 | Redfern | 375/260 |
| 2008/0288798 A1* | 11/2008 | Cooper et al. | 713/322 |
| 2009/0022214 A1 | 1/2009 | Locke | |
| 2010/0177855 A1* | 7/2010 | Ashikhmin et al. | 375/346 |
| 2011/0161702 A1* | 6/2011 | Conrad et al. | 713/320 |
| 2012/0082258 A1 | 4/2012 | Nuzman et al. | |

FOREIGN PATENT DOCUMENTS

EP  2391031 A1  11/2011

OTHER PUBLICATIONS

"Series G: Transmission Systems and Media, Digital Systems and Networks, Digital Sections and Digital Line System—Access Networks, Very High speed digital subscriber line transceivers 2 (VDSL2)," ITU-T, Telecommunication Standardization Sector of ITU, G.993.2, Dec. 2011, 376 pages.

(Continued)

*Primary Examiner* — Juan A Torres
(74) *Attorney, Agent, or Firm* — Conley Rose, P.C.; Grant Rodolph; William H. Dietrich

(57) ABSTRACT

A method of coordinating a plurality of transceiver units (TUs), the method comprising receiving an initialization intent notification from a first TU in the plurality of TUs, sending a low-power link state (LPLS) transition notification to a second TU in the plurality of TUs, receiving a LPLS transition complete notification from the second TU in response to the second TU transitioning from a first mode to a second mode, wherein in the first mode the second TU is in an LPLS with a long inactivity period (LPLS-L), sending an able to initialize notification to the first TU, and performing a vector training procedure using the first TU and the second TU.

23 Claims, 7 Drawing Sheets

(56) References Cited

OTHER PUBLICATIONS

"Series G: Transmission Systems and Media, Digital Systems and Networks, Digital Sections and Digital Line System—Access Networks, Self-FEXT Cancellation (Vectoring) for use with VDSL2 Transceivers," ITU-T, Telecommunication Standardization Sector of ITU, G.993.5, Apr. 2010, 80 pages.

Foreign Communication From a Counterpart Application, PCT Application No. PCT/CN2013/085291, International Search Report dated Jan. 23, 2014, 7 pages.

Foreign Communication From a Counterpart Application, PCT Application No. PCT/CN2013/085291, Written Opinion dated Jan. 23, 2014, 4 pages.

Humphrey, Les, "G.fast: Power dissipation requirements", ITU—Telecommunication Standardization Sector, Temporary Document 012-05-4A-036, Study Group 15, Question 4/15, Geneva, Switzerland, May 2012, 6 pages.

Humphrey, et al., "[FAST] Low Power Mode Requirements for G.fast", ITU—Telecommunication Standardization Sector, COM 15-C 0413-E, Study Group 15—Contribution 0413, Question 4/15, Jul. 2013, 5 pages.

Brown, Les, "Updated draft text for G.fast—version 7.0", ITU—Telecommunication Standardization Sector, Temporary Document 2013-09-Q4-R20, Study Group 15, Question 4/15, Barcelona, Spain, Sep.-Oct. 2013, 120 pages.

Wei, et al., "G.fast: On Transistion from L2.2 to Other States", ITU—Telecommunication Standardization Sector, COM 15-C 0141-E, Study Group 15, Question 4/15, Jul. 2013, 4 pages.

Fazlollahi, et al., "Timing Offset Correction in a TDD Vectored System", U.S. Appl. No. 13/799,864, filed Mar. 13, 2013, 30 pages.

* cited by examiner

INITIALIZATION AND TRACKING FOR LOW POWER LINK STATES

CROSS-REFERENCE TO RELATED APPLICATIONS

The present application claims the benefit of U.S. Provisional Application No. 61/714,525 filed Oct. 16, 2012 by Yixian Liu, et al. and entitled "Methods for Initialization and Tracking Under Low Power Link States," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Twisted-pair copper cables were initially employed to carry low-bandwidth voice signals. Today, they are widely used to carry high-speed broadband data signals from a central office (CO) or remote terminal (RT) to customer premise equipment (CPE) and vice versa in digital subscriber line (DSL) systems. The high-speed data communication over copper uses wider bandwidths, up to a few megahertz (MHz) in asymmetric digital subscriber line (ADSL), a few tens of MHz in a very-high-bit-rate digital subscriber line (VDSL/VDSL2), and a 100 MHz or greater in G.fast, a standard currently in development and in which many aspects are finalized. At higher frequencies, crosstalk coupling between adjacent pairs increases which may significantly degrade both data rate and stability performance. International Telecommunication Union (ITU) standard G.993.5 defines procedures and protocols, so called vectoring, to allow far-end crosstalk cancellation among VDSL2 modems, which may enhance performance.

The G.fast standard adopted time division duplexing (TDD) to transmit data signals in downstream and upstream directions. As such, the signal transmission in the time-domain is discontinuous and the entire available bandwidth may be used in both directions. The combination of TDD duplexing with the very high bandwidth and low transmit power of G.fast provides the ability to employ discontinuous mode power savings when using G.fast. For example, in discontinuous operation, not all of the time available for data transmission is utilized, for example, when user traffic is lower than the channel capacity, the entire system transmission and/or reception path may be turned off during some of the digital multi-tone (DMT) symbols within a TDD frame to save power in a digital front-end (DFE), an analog front-end (AFE), and/or a line driver (LD).

A frequency division duplex (FDD) system in comparison divides the communication channel in a frequency domain between each direction and transmission in time may be continuous. However, for power saving or other purposes, an FDD system may operate in discontinuous transmission, and VDSL2 systems are example FDD systems that may employ discontinuous transmission.

In low-power link states (LPLSs) in systems that employ discontinuous transmission, there may be no activity (e.g., no data signal communications) for some period of time between two modems.

SUMMARY

In one embodiment, the disclosure includes a method of coordinating a plurality of transceiver units (TUs), the method comprising receiving an initialization intent notification from a first TU in the plurality of TUs, sending a low-power link state (LPLS) transition notification to a second TU in the plurality of TUs, receiving a LPLS transition complete notification from the second TU in response to the second TU transitioning from a first mode to a second mode, wherein in the first mode the second TU is in an LPLS with a long inactivity period (LPLS-L), sending an able to initialize notification to the first TU, and performing a vector training procedure using the first TU and the second TU.

In another embodiment, the disclosure includes a method of coordinating a plurality of transceiver units (TUs), the method comprising sending a low-power link state (LPLS) transition notification to a TU in the plurality of TUs, receiving a LPLS transition complete notification from the TU in response to the TU transitioning from a first mode to a second mode, wherein in the first mode the TU is in an LPLS with a long inactivity period (LPLS-L), and collecting data from a second TU in the plurality of TUs about a crosstalk channel of the TU and collecting data from the TU about a crosstalk channel of the second TU.

In yet another embodiment, the disclosure includes a digital subscriber line access multiplexer (DSLAM) comprising a first TU, a second TU configured to operate in a first mode and a second mode, wherein the first mode is a LPLS with a LPLS-L, and a processor coupled to the first TU and the second TU, the processor configured to receive an initialization intent notification from the first TU, send a LPLS transition notification to the second TU, wherein the second TU is configured to transition from the first mode to the second mode in response to receiving the initialization intent notification, and receive a LPLS transition complete notification from the second TU in response to the second TU transitioning from the first mode to the second mode.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
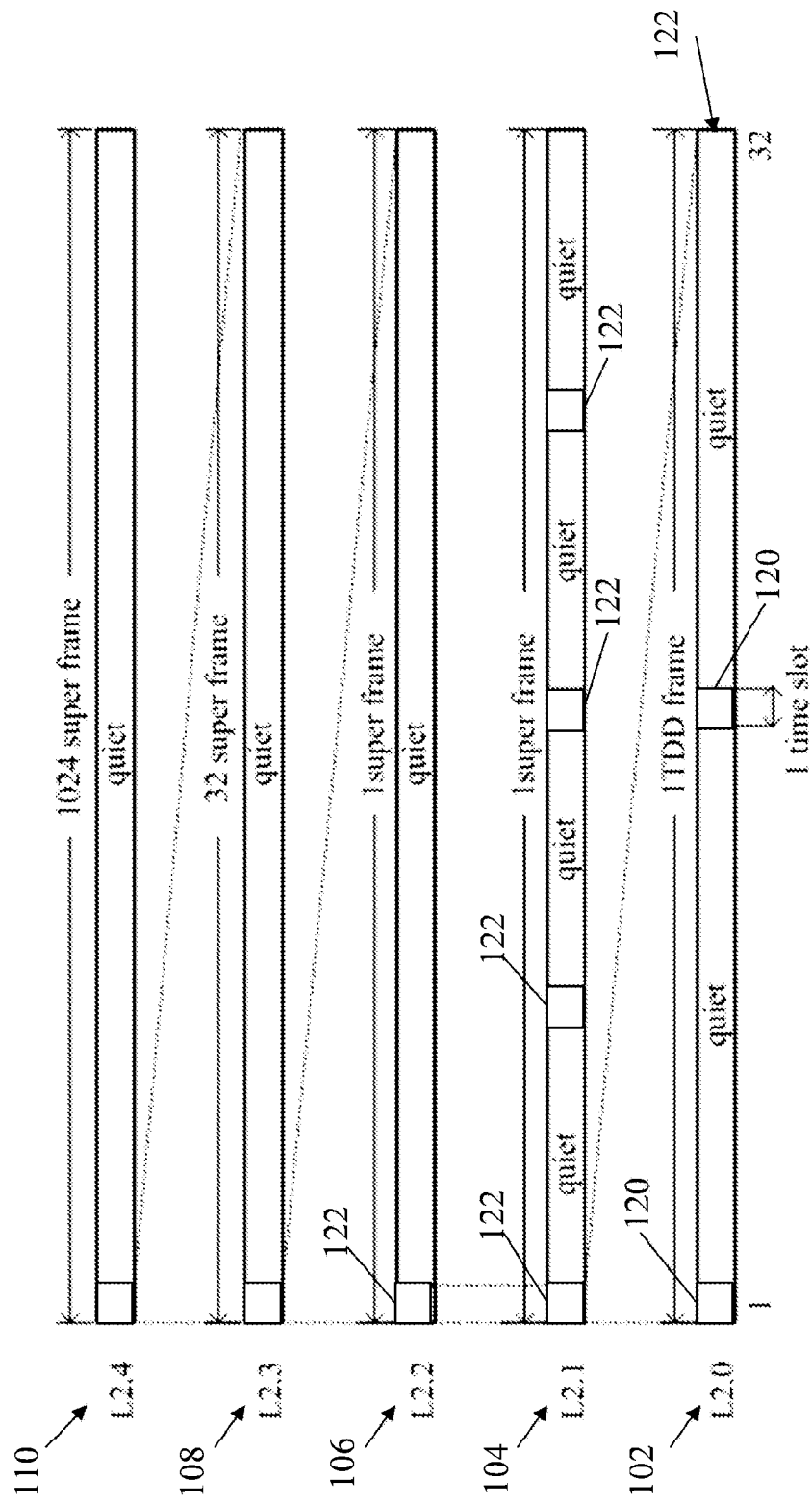
FIG. 1 is a timing diagram of embodiments of LPLS modes.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In LPLSs in a TDD system, there may be no activity (e.g., no data signal communications) for some period of time between two modems. Such periods of inactivity may not be suitable for performing procedures, such as the G993.5 far-end crosstalk (FEXT) cancellation training procedure or vector training. Consequently, it is desirable to develop performance enhancing procedures, when one or more subscriber lines may be in a LPLS with a long inactivity period.

Disclosed herein are methods, apparatus, and systems to improve the performance of DSL systems that employ discontinuous transmission. In particular, the performance of a G.fast system or a VDSL2 system having one or more LPLSs in a mode having long periods of inactivity may be improved by selectively transitioning the one or more LPLSs from the mode with long periods of inactivity to a mode with shorter periods of inactivity. For example, reducing periods of inactivity may increase the frequency that synchronization signals are transmitted and thereby reduce the time required to perform initialization. Additionally, briefly increasing the activity of LPLSs having long periods of inactivity in a controlled manner may improve the ability of a G.fast system or a VDSL2 system to track crosstalk channel variations and to reduce the effects of FEXT. The term "discontinuous mode" is used generally to refer to a mode of operation in which not all of the available time for data transmission is used in a particular direction (e.g., uplink or downlink). For example, in a TDD system, such as G.fast, a period of time may be allocated for transmission in a direction, but not all of the period of time may be used for transmission. In an FDD system, such as VDSL2, each direction may have the ability to transmit continuously but the system may decide to use discontinuous transmission in a direction (and therefore be in a discontinuous mode) for any of a variety of reasons, such as to save power or reduce crosstalk. For illustrative purposes, many of the embodiments presented herein are TDD embodiments for G.fast, but one of ordinary skill in the art will recognize that the embodiments apply to FDD system in a discontinuous mode.

In an embodiment, a LPLS may be characterized as having a short inactivity period (LPLS-S) or a LPLS mode with a LPLS-L. A LPLS-S may operate in a discontinuous mode and may provide enough signal activity for receiver timing and crosstalk tracking, whereas a LPLS-L may also operate in a discontinuous mode but may not provide enough signal activity for receiver timing and crosstalk tracking. For example, a short inactive period may be generally defined as a period of less than one super frame and a long inactive period may be generally defined as a period of at least (or about equal to) one super frame, wherein one super frame may consist of about eight TDD frames marked by a synchronization symbol (or sync symbol) in a G.fast system or 256 data symbols plus a synchronization symbol, for a total of 257 symbols, in a VDSL2 system.

FIG. 1 is a timing diagram of embodiments of LPLS low power modes. A LPLS may be configured to operate in a variety of low power modes. Examples of LPLS low power modes may be as disclosed in International Telecommunications Union Standardization (ITU-T) SG15 Q4 contribution entitled "G.fast: Power dissipation requirements," submitted in May 2012 by British Telecom, which is hereby incorporated by reference in its entirety. For example, as shown in FIG. 1, a LPLS may be configured to operate in a L2.0 mode 102, a L2.1 mode 104, a L2.2 mode 106, a L2.3 mode 108, or a L2.4 mode 110. In such an embodiment, a TDD frame 122 may comprise 32 time slots 120 which a DMT symbol may be transmitted. For example, a TDD frame 122 may be about 750 microseconds. Additionally, a superframe may comprise 32 TDD frames 122. In an embodiment, the L2.0 mode 102 may be configured to limit the data transmission time to within a TDD frame. For example, the L2.0 mode 102 may be configured to utilize two time slots 120 (e.g., a downstream slot and an upstream slot) per TDD frame 122. Additionally, the inactivity period of the L2.0 mode 102 may be about 0.75 milliseconds (ms). In an embodiment, the L2.1 mode 104 may be configured to limit the data transmission time to within a TDD frame and may allow an increased latency of about 6 ms. For example, the L2.1 mode 104 may comprise a superframe configured such that four TDD frames 122 (e.g., the first, ninth, seventeenth, and the twenty-fifth TDD frames) are active. Additionally, the inactivity period of the L2.1 mode 104 may be about 6 ms. In an embodiment, the L2.2 mode 106 may be configured to limit the data transmission time to within a TDD frame and may allow a latency up to about 24 ms, for example, for "keep-alive" applications. For example, the L2.2 mode 106 may comprise a superframe configured such that only one TDD frame 122 is active. The L2.3 mode 108 may comprise 32 superframes where only one TDD frame 122 is active. For example, the inactivity period of the L2.3 mode 108 may be about 768 ms. The L2.4 mode 110 may comprise 1024 superframes and only one TDD frame. For example, the inactivity period of the L2.4 mode 110 may be about 24 seconds (s). Additional LPLS details may be as disclosed in ITU-T SG15 Q4 contribution entitled "Low Power Mode Requirements for G.fast," submitted in July 2013 by British Telecom, which is hereby incorporated by reference in its entirety. What we refer here as L2.3 may be adopted by the G.fast standard and called L2.2.

Additionally, a LPLS may be configured to operate in an L3 idle state mode, for example, a L3.1 mode or in a L3.2 mode. For example, the L3.1 mode may be powered idle state mode and may be configured such that a subscriber line is powered and no data signal is on the subscriber line. The L3.2 mode may be an unpowered idle state mode and may be configured such that a subscriber line is not powered and no data signal is on the subscriber line. Alternatively, any other suitable LPLS and/or low power mode may be employed as would be appreciated by one of ordinary skill in the art upon viewing this disclosure.

Figure 2:
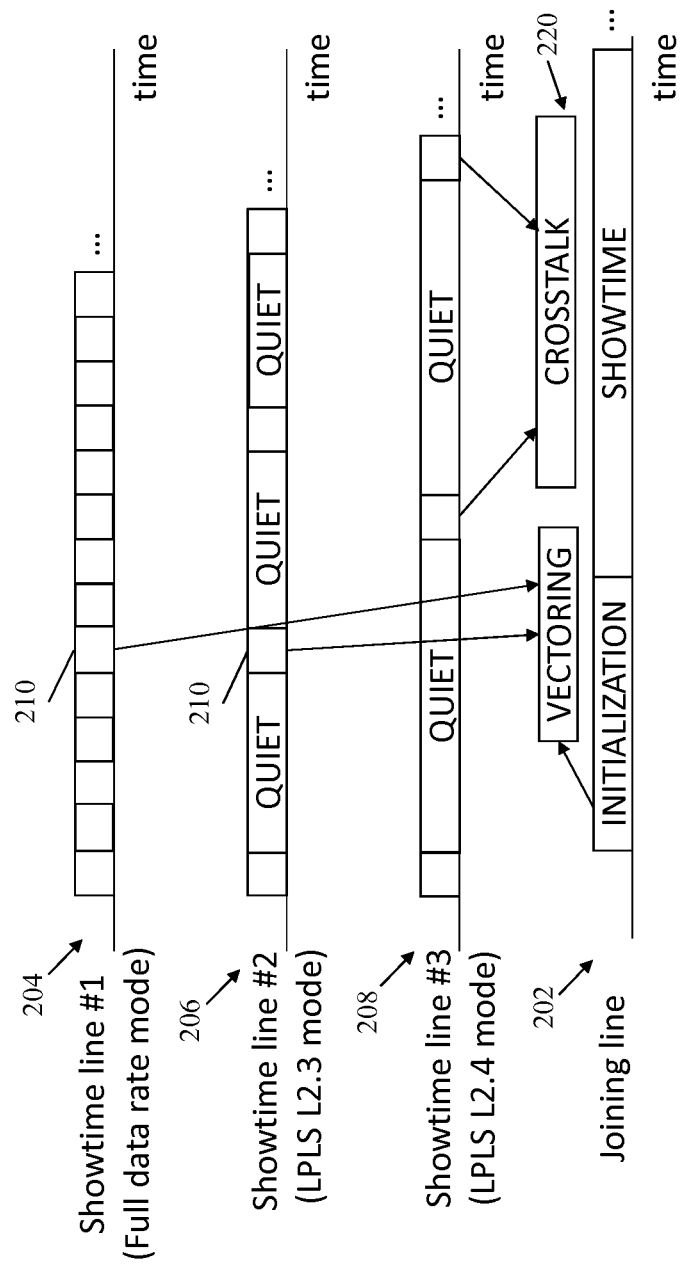
FIG. 2 is a timing diagram of an embodiment of an initialization procedure.

FIG. 2 is a timing diagram of an embodiment of an initialization procedure. In a conventional system, when a new joining subscriber line attempts to initialize while one or more of the existing subscriber lines of a vectored group are operating in a LPLS-L mode, the process of crosstalk channel estimation from the LPLS-L lines into the joining subscriber line and/or from the joining subscriber line into the LPLS-L subscriber lines may require long durations of time due to the long inactive periods of the LPLS-L lines. Additionally, tracking crosstalk channel variations between showtime lines may become difficult or complex as a result of one or more of the subscriber lines in a vectored group operating in a LPLS-L mode. In the embodiment of FIG. 2, a joining subscriber line 202 is performing an initialization procedure with a vectored group comprising a first showtime subscriber line 204 configured in a full data rate mode, a second showtime subscriber line 206 configured in a LPLS L2.3 mode, and a third showtime subscriber line 208 configured in a LPLS L2.4 mode.

During the initialization procedure, the joining subscriber line 202 may attempt to perform vectoring with the vectored group. For example, the first showtime subscriber line 204 and the second showtime subscriber line 206 may each communicate a synchronization symbol or a sync symbol 210 with the joining subscriber line 202. In such an embodiment, the joining subscriber line 202 may not receive a sync symbol from the third showtime subscriber line 208 due to the long periods of inactivity. Thus, showtime subscriber lines operating in a LPLS-L mode may not be suitable procedures, such as, for vector training. The term "vectoring" is well-known in the art and refers to pre-coding and post-cancellation in a DSLAM to correct for FEXT. Similarly, "vector training" is well-known in the art and refers to the training precoders and/or post-cancellers. See, e.g., U.S. patent application Ser. No. 13/799,864, filed Mar. 13, 2013 and entitled "Timing offset correction in a TDD vectored system," which is hereby incorporated by reference in its entirety. Additionally, the third showtime subscriber line 208 may induce crosstalk 220 between the lines when the third showtime subscriber line 208 begins transmitting.

Figure 3:
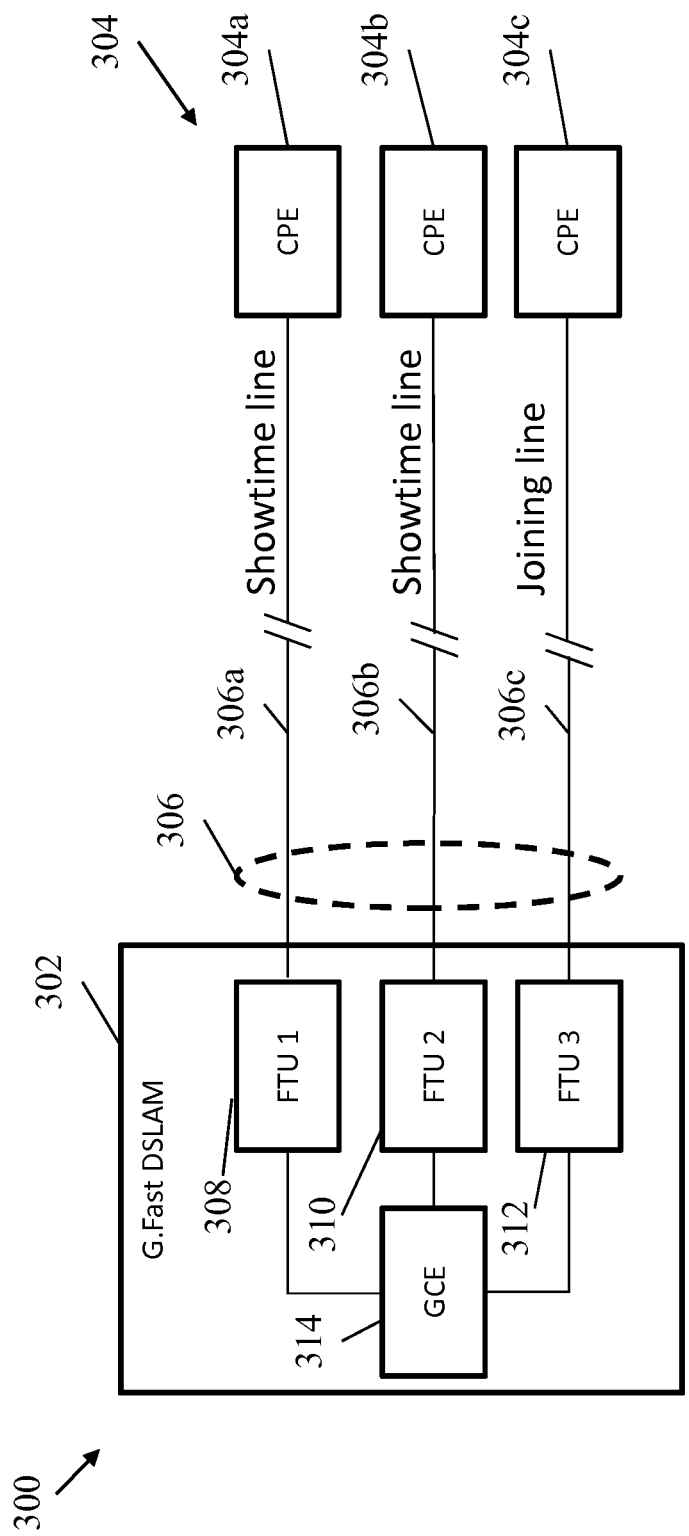
FIG. 3 is a schematic diagram of an embodiment of a DSL system.

FIG. 3 is a schematic diagram of an embodiment of a DSL system 300. The DSL system 300 comprises a G.fast DSLAM 302 coupled to a plurality of CPEs 304 (e.g., a G.fast transceiver at a remote terminal (FTU-R)) via a plurality of subscriber lines 306. The G.fast DSLAM 302 comprises a vectoring control entity (VCE) or a G.fast control entity (GCE) 314 coupled to a plurality of G.fast transceiver units (FTUs), for example, a first FTU 308, a second FTU 310, and a third FTU 312. The GCE 314 may be configured to communicate data and/or signaling commands to the FTUs 308-312 and/or between the FTUs 308-312 and receive data and/or signaling commands from the FTUs 308-312. The FTUs may be configured to communicate (e.g., transmit and/or receive) user data and/or control signals between the G.fast DSLAM 302 and the CPEs 304 via the subscriber lines 306. As shown, the first FTU 308 is coupled to a first CPE 304a via a first subscriber line 306a, the second FTU 310 is coupled to a second CPE 304b via a second subscriber line 306b, and the third FTU 312 is coupled to a third CPE 304c via a third subscriber line 306c. Three FTUs and three CPEs are shown in FIG. 3 for illustrative purposes, but a DSL system may comprise any number of FTUs and CPEs. Furthermore, as one of ordinary skill in the art will recognize, G.fast is used for illustrative purposes, but the subject matter applies also to VDSL2 in discontinuous mode, wherein the G.Fast DSLAM 302 is instead a VDSL2 access node comprising a plurality of VDSL2 transceiver units and the CPEs 304a-304c are instead VDSL2 transceivers.

In the embodiment of FIG. 3, the first subscriber line 306a and the second subscriber line 306b are shown configured as a showtime line and the third subscriber line 306c is shown configured as a joining subscriber line. The states of the subscriber lines 306a-306c are selected to illustrate the method 400 described below.

Figure 4:
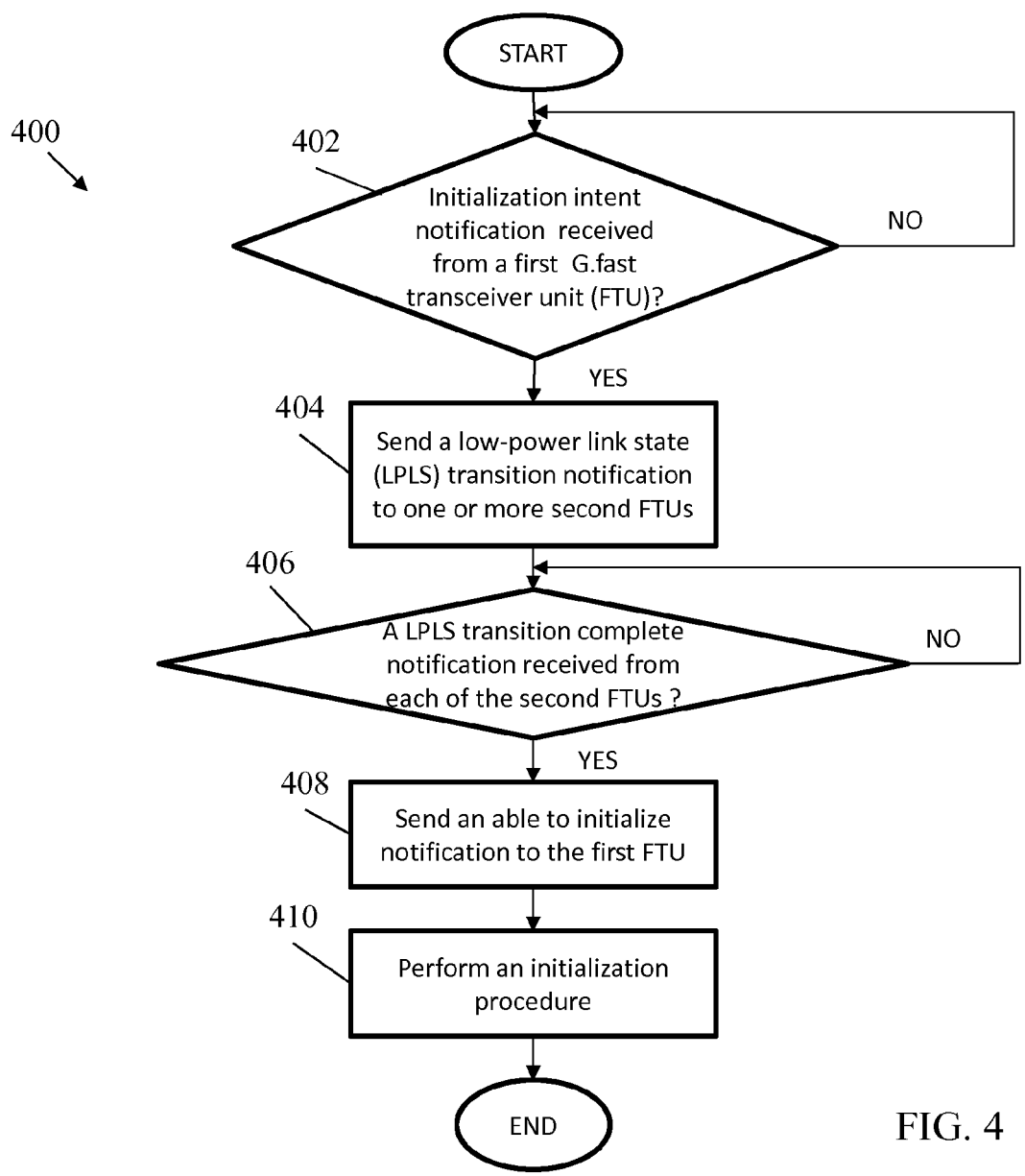
FIG. 4 is a flowchart of an embodiment of an initialization method.

FIG. 4 is a flowchart of an embodiment of an initialization method 400. In an embodiment, the initialization method 400 may be employed by a DSL system when a subscriber line joins a vectored group, e.g., as shown in the DSL system 300. For example, a vectored group may comprise one or more subscriber lines in a LPLS-L mode. In step 402, when a subscriber line (e.g., the third subscriber line 306c of FIG. 3) would like to join a vectored group, a corresponding FTU (e.g., the third FTU 312 of FIG. 3) sends an "initialization intent" notification to the GCE (e.g., GCE 314 of FIG. 3).

In step 404, in response to receiving the initialization intent notification, the GCE may communicate a "LPLS transition" notification to one or more other subscriber lines (e.g., the first subscriber line 306a and the second subscriber line 306b of FIG. 3) of the vectored group. In an embodiment, the LPLS transition notification may indicate that the subscriber lines in a LPLS-L mode should transition to a LPLS-S mode which can support vector training. Additionally or alternatively, the subscriber line in a LPLS-L mode may transition to full-power data mode, if no such LPLS-S mode is defined. For example, a subscriber line may transition from a LPLS L2.2 mode to a LPLS L2.0 mode. In an embodiment, the subscriber line may transition from a LPLS L2.2 mode to a L0 mode (a normal operating mode), a LPLS L2.0 mode, or a LPLS L2.1 within a TDD frame, a superframe, or in about 1 second. Alternatively, the subscriber line may require additional transition time, for example, if a change of powering state (e.g., from a direct current (DC) to an alternating current (AC) or vice versa) is required. Additionally, the GCE may align the activity periods of the subscriber lines in the time domain and/or pair them sequentially, for example, to improve vector training performance (e.g., training speed). For example, referring to FIG. 3, the GCE 314 may form a pair comprising the first subscriber line 306a with the third subscriber line 306c and/or a pair comprising the second subscriber line 306b with the third subscriber line 306c, for example, to estimate crosstalk channels between the first CPE 304a and the third CPE 304c and/or the second CPE 304b and the third CPE 304c, respectively. Additionally, in an embodiment, the first subscriber line 306a and the second subscriber line 306b may not be simultaneously active. Further, an active period may be in any frame and/or any symbol of a frame. As such, the active period may not necessarily be over a sync symbol activity period during a sync frame.

In an alternative embodiment, the LPLS transition notification may indicate that the subscriber lines configured in a LPLS-L mode should transition to a mode which periodically sends a signal, such as a sync signal or the like (e.g., a signal with properties known to transmitter and receiver), to support vector training. For example, a showtime line configured in a LPLS L2.4 mode may transition to a mode which periodically sends a sync signal. In an embodiment, the interval duration may be the same as full data rate mode, for example, one or more sync symbols per superframe. The GCE may align the activity periods of the subscriber lines in the time domain and/or pair them sequentially, similar to as previously disclosed. Further, an active period may be in any frame and/or any symbol of a frame. As such, the active period may not necessarily be over a sync symbol activity period during a sync frame. Additionally, a subscriber line configured in a LPLS-S mode may remain in a LPLS-S mode.

Referring again to FIG. 4, in step 406, upon transitioning the subscriber lines from the LPLS-L mode to a second mode (e.g., to a LPLS-S mode or full-power data mode, etc.), each subscriber line may send a "LPLS transition complete" notification or a "ready to send sync symbol" notification to the GCE. In step 408, upon receiving a LPLS transition complete notification from each of the showtime subscriber lines, the GCE may send an "able to initialize" notification to the corresponding FTU of the joining subscriber line. In step 410, in response to receiving the able to initialize notification, the joining subscriber line may perform an initialization procedure. For example, the joining subscriber line may perform vector training with other subscriber lines (e.g., showtime lines) of the vectored group. Alternatively, the joining subscriber line may perform any other suitable initialization procedure as would be appreciated by one of ordinary skill in the art upon viewing this disclosure. Upon the completion of the initialization procedure, the GCE may inform the showtime subscriber lines to transition to any desired LPLS mode. Additionally or alternatively, upon the completion of the initialization procedure, the GCE may inform the showtime subscriber lines to suspend sending sync symbols.

Figure 5:
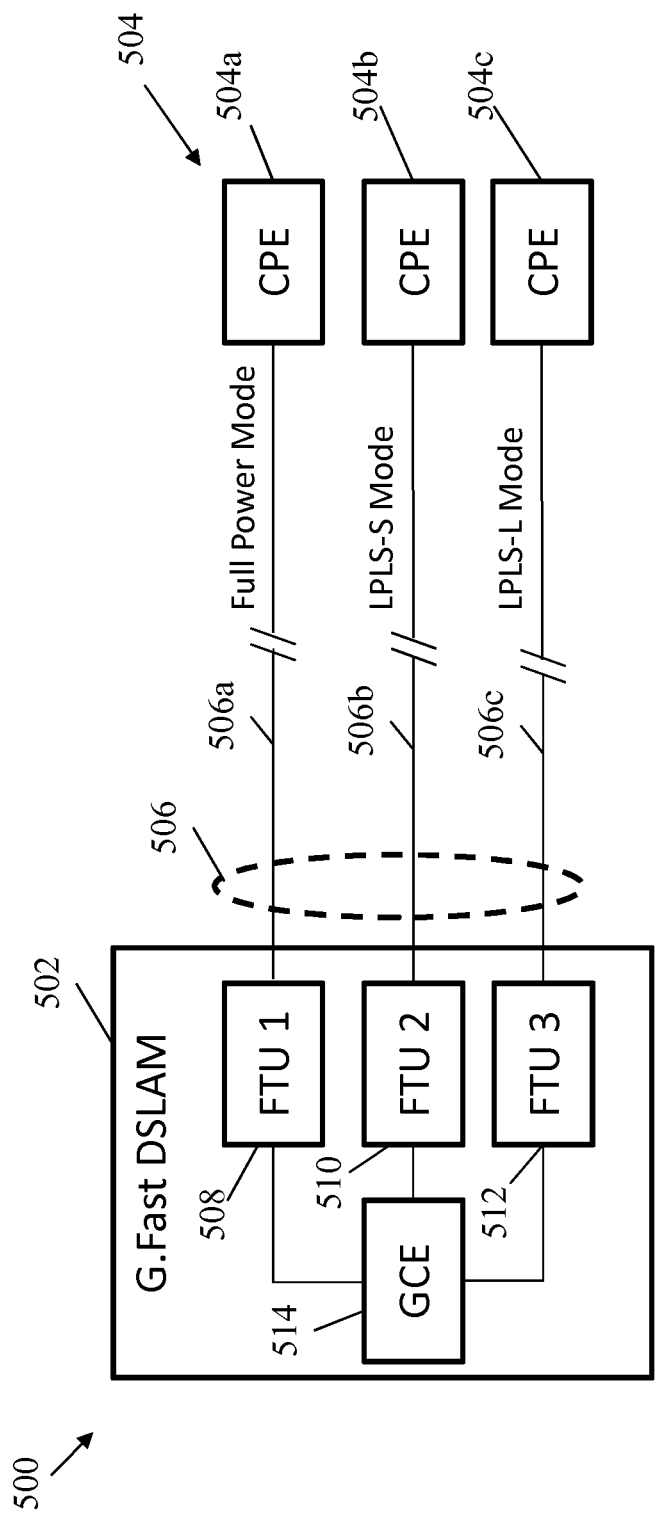
FIG. 5 is a schematic diagram of another embodiment of a DSL system.

FIG. 5 is a schematic diagram of another embodiment of a DSL system 500. The DSL system 500 is configured similar to the DSL system 300, as previously disclosed, with respect to FIG. 3. For example, the DSL system 500 comprises a G.fast DSLAM 502 coupled to a plurality of CPEs 504 via a plurality of subscriber lines 506. Additionally, the G.fast DSLAM 502 comprises a GCE 514 coupled to a first FTU 508, a second FTU 510, and a third FTU 512. Further, the first FTU 508 is coupled to a first CPE 504a via a first subscriber line 506a, the second FTU 510 is coupled to a second CPE 504b via a second subscriber line 506b, and the third FTU 512 is coupled to a third CPE 504c via a third subscriber line 506c.

In the embodiment of FIG. 5 for the purpose of illustrating the method 600 discussed below, the first subscriber line 506a is configured in a full power mode, the second subscriber line 506b is configured in a LPLS-S mode, and the third subscriber line 506c is configured as a LPLS-L mode. The subscriber lines 506a-506c are not restricted to using only these modes and may use any available mode. In an embodiment, tracking the crosstalk channel variation between subscriber lines may be difficult when one or more subscriber lines of a vectored group are in a LPLS-L mode due to long periods of inactivity on a subscriber line. For example, crosstalk channels may not vary quickly over time but may gradually change in response to ambient temperature and/or humidity changes, which may be tracked to provide optimum modem performance.

Figure 6:
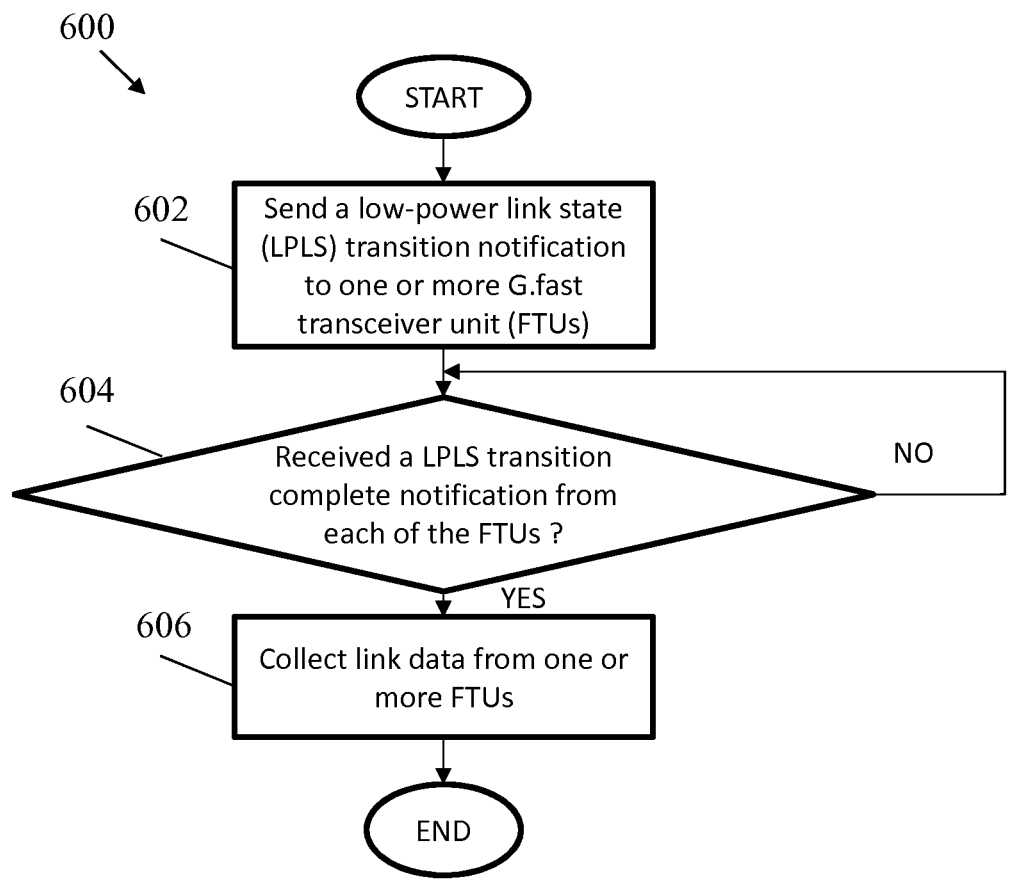
FIG. 6 is a flowchart of an embodiment of a link tracking method.

FIG. 6 is a flowchart of an embodiment of a link tracking method 600. In an embodiment, the link tracking method 600 may be employed by a DSL system (e.g., in a DSL system 500) when crosstalk channels between two modems in which at least one modem is in LPLS-L needs to be updated. In step 602, when crosstalk channel estimations need to be performed, the GCE may communicate a "LPLS transition" notification to one or more other subscriber lines configured in a LPLS-L mode (e.g., the third subscriber line 506c of FIG. 5). In an embodiment, the LPLS transition notification may indicate that the subscriber lines in a LPLS-L mode should transition to a LPLS-S mode which can support crosstalk channel tracking. Additionally or alternatively, the subscriber line in a LPLS-L mode may transition to full-power data mode, if no such LPLS-S is defined. In an embodiment, the subscriber line may transition from a LPLS L2.2 mode to a L0 mode, a LPLS L2.0 mode, or a LPLS L2.1 within a TDD frame, a superframe, or in about 1 second. Alternatively, the subscriber line may require additional transition time, for example, if a change of powering state (e.g., from DC to AC or vice versa) is required. In an alternative embodiment, the LPLS transition notification may indicate that the subscriber lines configured in a LPLS-L mode should transition to a mode which periodically sends a signal, such as a sync signal or the like (e.g., a signal with properties known to both transmitter and receiver), to support crosstalk channel tracking. For example, the subscriber line may transition to a mode which periodically sends a sync signal. In an embodiment, the interval duration may be the same as full data rate mode, for example, one or more sync symbols per superframe. Additionally, a subscriber line configured in a LPLS-S mode may remain in a LPLS-S mode. In step 604, upon transitioning the subscriber lines from a LPLS-L mode to a second mode (e.g., to a LPLS-S mode, a full-power data mode, etc.), each subscriber line may send a "LPLS transition complete" notification to the GCE.

In step 606, the GCE may collect data (e.g., link or channel data) from the signals provided by the modems, for example, to perform and/or to update crosstalk channel estimations. In an embodiment, the active transmit opportunity of the subscriber lines configured in a LPLS-S mode may be controlled by the GCE. Additionally, the GCE may align the activity periods of the subscriber lines in the time domain and/or pair them sequentially. For example, referring to FIG. 5, the GCE 514 may form a pair comprising the first subscriber line 506a with the third subscriber line 506c and/or a pair comprising the second subscriber line 506b with the third subscriber line 506c, for example, to estimate crosstalk channels between the first CPE 504a and the third CPE 504c and/or the second CPE 504b and the third CPE 504c, respectively. As understood by a person of ordinary skill in the art, crosstalk channel data may be collected from subscriber lines in a pairwise manner. Further, an active period of sync-like signals may be in any frame and/or any symbol of a frame. As such, the active period may not necessarily be over a sync symbol activity period during a sync frame. Additionally, upon the completion of the crosstalk channel estimation procedure, the GCE may inform the subscriber lines to transition to any desired LPLS mode. Additionally or alternatively, upon the completion of the data collection and/or the crosstalk channel estimation procedure, the GCE may inform the subscriber lines to suspend sending sync symbols.

Figure 7:
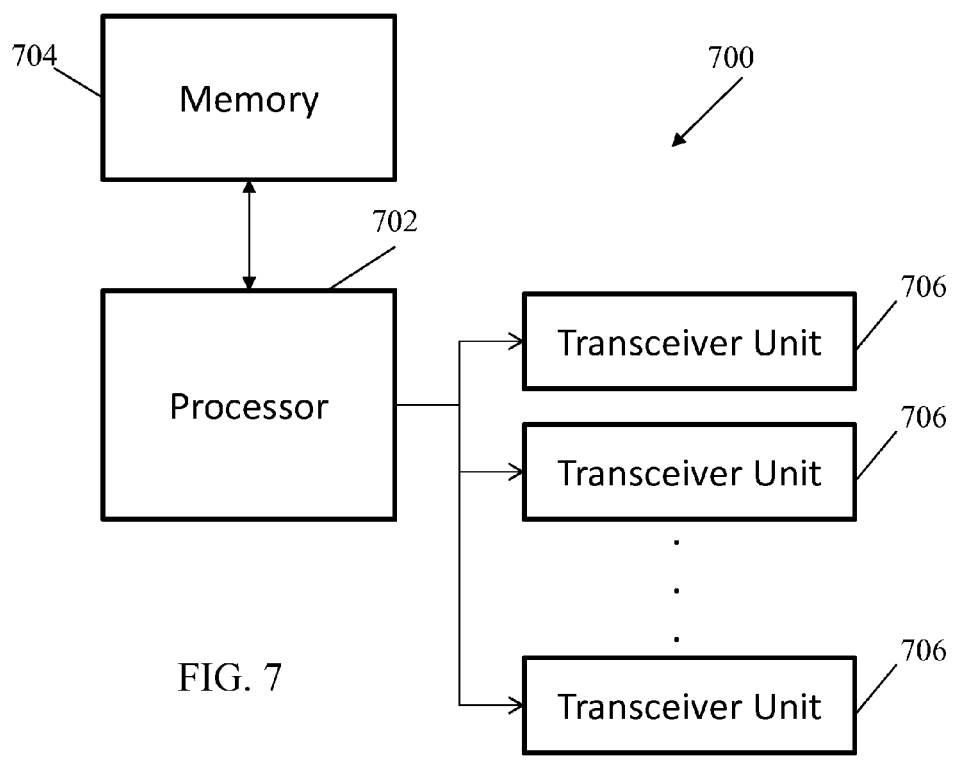
FIG. 7 is a schematic diagram of an embodiment of a networking communication device.

FIG. 7 is a schematic diagram of an embodiment of a network device 700. The network device 700 is suitable for implementing one or more embodiments of the components disclosed herein, such as the initialization method 400 and the link tracking method 600. The network device 700 may be a G.fast DSLAM or a VDSL2 access node. The network device 700 includes a processor 702 (which may be referred to as a central processing unit or CPU) that is in communication with a memory 704, and one or more transceiver units 706. For example, the network device 700 may comprise a plurality of transceivers units 706, each of which is coupled to a different subscriber line. The processor 702 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 702 may implement a GCE as described herein.

The memory 704 may comprise a secondary storage, read only memory (ROM), random access memory (RAM), any other suitable data storage device as would be appreciated by one of ordinary skill in the art upon viewing this disclosure, or combination thereof. Secondary storage may comprise of one or more disk drives, solid state drives, or tape drives and is used for non-volatile storage of data and as an over-flow data storage device if a RAM is not large enough to hold all working data. The secondary storage may be used to store programs that are loaded into a RAM when such programs are selected for execution. A ROM may be used to store instructions and perhaps data that are read during program execution. The ROM may be a non-volatile memory device that typically has a small memory capacity relative to the larger memory capacity of a secondary storage. The RAM may be used to store volatile data and perhaps to store instructions. Access to both the ROM and the RAM is typically faster than to the secondary storage. In an embodiment, instructions to be executed by the processor 702 may be stored in the memory 704.

Each of the transceiver units 706 may serve as an output and/or input device of communication device 700. Each of the transceiver units 706 may take the form of DSL modem configured to implement the methods described herein. For example, the transceiver units 706 may be G.fast transceiver units or VDSL2 transceiver units. As appreciated by one of ordinary skill in the art, each transceiver unit 706 may comprise one or more filters, equalizers, or amplifiers used to implement a DSL modem. In an embodiment, the transceiver unit 706 may comprise a FTU. Additionally, the transceiver unit 706 may comprise a local memory, such as a ROM, a RAM, or a secondary storage device (not shown). For example, a local memory may be used to store instructions for a transceiver unit 706 and perhaps data that are read during program execution.

It is understood that by programming and/or loading executable instructions onto the communication device 700, at least one of the processor 702, the memory 704, or the transceiver units 706 are changed, transforming the communication device 700 in part into a particular machine or apparatus, e.g., a DSL communication device, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an embodiment, a DSL system employing an initialization and/or a link tracking method, as disclosed herein or in some portion thereof, may provide a means for joining a new subscriber line to a vectored group where some or all of its members may be in a LPLS-L mode. In a conventional system, when a new subscriber line attempts to initialize while one or more existing subscriber lines of a vectored group are in a LPLS-L mode, the process of crosstalk channel estimation may require long durations of time due to the subscriber lines in a LPLS-L mode being inactive most of the time. Employing the initialization method and/or the link tracking method may improve the performance of the DSL system by reducing the time required to join a new subscriber line to a vectored group by increasing the activity of the subscriber lines. Additionally, in a conventional system, tracking crosstalk channel variations between subscriber lines may be difficult when one or more subscriber lines in a vectored group are in a LPLS-L mode. Again, employing the initialization method and/or the link tracking method may improve the performance of the DSL system by transitioning the subscriber lines in a LPLS-L mode to alternative mode to increase the activity of the subscriber lines.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of coordinating a plurality of transceiver units (TUs), the method comprising:

receiving an initialization intent notification from a first TU in the plurality of TUs;

sending a low-power link state (LPLS) transition notification to a second TU in the plurality of TUs;

receiving a LPLS transition complete notification from the second TU in response to the second TU transitioning from a first mode to a second mode, wherein in the first mode the second TU is in an LPLS with a long inactivity period (LPLS-L);

sending an able to initialize notification to the first TU; and performing a vector training procedure using the first TU and the second TU.

2. The method of claim 1, wherein in the second mode the second TU is configured as an LPLS with a short inactivity period (LPLS-S) or configured in a full data rate mode or a mode which periodically sends a signal to support vector training.

3. The method of claim 1, wherein in the first mode the second TU is configured to not send a synchronization signal and wherein in the second mode the second TU is configured to send the synchronization signal.

4. The method of claim 1, wherein the first mode does not support vector training and wherein the second mode supports vector training.

5. The method of claim 1, further comprising transitioning the second TU from the second mode to the first mode upon completing the initialization procedure.

6. The method of claim 1, wherein the plurality of TUs are G.fast TUs (FTUs) or very-high-bit-rate digital subscriber line 2 (VDSL2) TUs.

7. The method of claim 1, wherein the vector training procedure comprises:

collecting data from the second TU about a crosstalk channel of the first TU and collecting data from the first TU about the crosstalk channel of the second TU.

8. The method of claim 1, further comprising transitioning, by the second TU, from the first mode to the second mode in response to receiving the LPLS transition notification.

9. The method of claim 2, wherein the long inactive period is about one super frame and wherein the short inactivity period is less than one super frame, wherein a super frame consists of about 8 TDD frames in a G.fast system or 257 symbols in a very-high-bit-rate digital subscriber line 2 (VDSL2) system, marked by a synchronization symbol.

10. A method of coordinating a plurality of transceiver units (TUs), the method comprising:

sending a low-power link state (LPLS) transition notification to a TU in the plurality of TUs;

receiving a LPLS transition complete notification from the TU in response to the TU transitioning from a first mode to a second mode, wherein in the first mode the TU is in an LPLS with a long inactivity period (LPLS-L); and collecting data from a second TU in the plurality of TUs about a crosstalk channel of the TU and collecting data from the TU about a crosstalk channel of the second TU.

11. The method of claim 10, wherein in the second mode the TU is configured as a LPLS with a short inactivity period (LPLS-S) or configured in full data rate mode or a mode which periodically sends a signal to support vector training.

12. The method of claim 10, wherein in the first mode the TU is configured to not send a synchronization signal and wherein in the second mode the TU is configured to send the synchronization signal.

13. The method of claim 10, further comprising transitioning the TU from the second mode to the first mode upon completing the collecting data from the TU.

14. The method of claim 10, wherein the first mode does not support vector training and wherein the second mode supports vector training.

15. The method of claim 10, further comprising transitioning, by the TU, from the first mode to the second mode in response to the LPLS transition notification.

16. The method of claim 11, wherein the long inactive period is at least one super frame and wherein the short inactivity period is less than one super frame, wherein a super frame consists of about 8 TDD frames in a G.fast system or 257 symbols in a VDSL2 system, marked by a synchronization symbol.

17. A digital subscriber line access multiplexer (DSLAM) comprising:

a first transceiver unit (TU);

a second TU configured to operate in a first mode and a second mode, wherein in the first mode the second TU is in a low-power link state (LPLS) with a long inactivity period (LPLS-L); and a processor coupled to the first TU and the second TU, the processor configured to:

receive an initialization intent notification from the first TU;

send a LPLS transition notification to the second TU, wherein the second TU is configured to transition from the first mode to the second mode in response to receiving the initialization intent notification; and receive a LPLS transition complete notification from the second TU in response to the second TU transitioning from the first mode to the second mode; and perform a vector training procedure using the first TU and the second TU.

18. The DSLAM of claim 17, wherein the second mode is a LPLS with a short inactivity period (LPLS-S) or a full data rate mode or a mode which periodically sends a signal to support vector training.

19. The DSLAM of claim 17, wherein in the first mode the second TU is configured to not send a synchronization signal and wherein in the second mode the second TU is configured to send the synchronization signal.

20. The DSLAM of claim 17, wherein the first mode does not support vector training and wherein the second mode supports vector training.

21. The DSLAM of claim 17, wherein the controller is configured to transition the second TU from the second mode to the first mode.

22. The DSLAM of claim 17, wherein the first TU and the second TU are G.fast TUs (FTUs) or very-high-bit-rate digital subscriber line 2 (VDSL2) TUs.

23. The DSLAM of claim 18, wherein the long inactive period is at least one superframe and wherein the short inactivity period is less than one super frame, wherein a super frame consists of about 8 TDD frames in a G.fast system or 257 symbols in a VDSL2 system, marked by a synchronization symbol.

* * * * *